(12) United States Patent
Van Den Hende et al.

(10) Patent No.: US 11,314,487 B2
(45) Date of Patent: Apr. 26, 2022

(54) DEVELOPMENT METHOD FOR DEVELOPING A PROGRAM AND CORRESPONDING DEVELOPMENT DEVICE

(71) Applicant: ALSTOM Transport Technologies, Saint-Ouen (FR)

(72) Inventors: Jean-Christophe Van Den Hende, Puteaux (FR); Olivier Rolland, Millery (FR)

(73) Assignee: ALSTOM Transport Technologies, Saint-Ouen (FR)

( * ) Notice: Subject to any disclaimer, the term of this patent is extended or adjusted under 35 U.S.C. 154(b) by 0 days.

(21) Appl. No.: 16/265,543

(22) Filed: Feb. 1, 2019

(65) Prior Publication Data

US 2019/0243615 A1    Aug. 8, 2019

(30) Foreign Application Priority Data

Feb. 2, 2018 (FR) ...................................... 18 50883

(51) Int. Cl.
*G06F 8/34* (2018.01)
*G06F 8/35* (2018.01)

(52) U.S. Cl.
CPC . *G06F 8/34* (2013.01); *G06F 8/35* (2013.01)

(58) Field of Classification Search
CPC ..................................... G06F 8/34; G06F 8/35
(Continued)

(56) References Cited

U.S. PATENT DOCUMENTS 8,612,870 B2    12/2013  Kodosky et al.
10,338,897 B2 *  7/2019  Javadi ....................... G06F 8/34
(Continued)

FOREIGN PATENT DOCUMENTS

WO    2000060458 A1    10/2000
WO    20090052257 A1    4/2009

OTHER PUBLICATIONS

Yildirim et al, "Application of Functional Safety on Railways Part II: Software Development", Proceedings of 2011 8th Asian Control Conference (ASCC), Kaohsiung, Taiwan, May 15-18, 2011.*
Yildirim et al, "Application of Functional Safety on Railways Part I: Modelling & Design", 2011, Proceedings of 2011 8th Asian Control Conference (ASCC), Kaohsiung, Taiwan, May 15-18, 2011.*
Mecitoğlu et al, "A UML Modelling Approach fora Railway Signalization System Simulator and SCADA System", [Online], 2013, pp. 77-82, [Retrieved from internet on Oct. 27, 2021], <https://www.sciencedirect.com/science/article/pii/S1474667015352113> (Year: 2013).*

(Continued)

*Primary Examiner* — S. Sough
*Assistant Examiner* — Zengpu Wei
(74) *Attorney, Agent, or Firm* — Soquel Group LLC

(57) ABSTRACT

A method to develop a computer program, including providing a visual environment for building a visual representation of the computer program, the visual representation including at least one functional graphic element representing a computer operator of the program and including at least one input for supplying the operator with an incoming datum, the visual representation also including a plurality of graphic stream elements each representing a respective datum intended to be processed by the operator, and at least one instantiating graphic element connected to an input of the functional graphic element and to each of the graphic stream elements, the method also including the implementation of the computer program, during which the computer operator is instantiated a number of times equal to the number of graphic stream elements, each instance of the operator having, as incoming data, a respective datum from the data represented by the graphic stream elements.

7 Claims, 8 Drawing Sheets

(58) Field of Classification Search
USPC .......................................................... 717/105
See application file for complete search history.

(56) References Cited

U.S. PATENT DOCUMENTS

| | | | |
|---|---|---|---|
| 2008/0134158 A1 | 6/2008 | Salz et al. | |
| 2014/0229506 A1* | 8/2014 | Lee | G06F 16/24535 707/774 |
| 2015/0291193 A1* | 10/2015 | Perras | B61L 15/0018 246/122 R |
| 2016/0062747 A1 | 3/2016 | Stanfill et al. | |
| 2017/0124481 A1* | 5/2017 | Crabtree | G06Q 10/0637 |
| 2017/0131976 A1 | 5/2017 | Valdez et al. | |
| 2019/0035270 A1* | 1/2019 | Astigarraga | G08G 1/052 |
| 2019/0391981 A1* | 12/2019 | Hosoya | G06F 16/9024 |

OTHER PUBLICATIONS

Wang et al, "Model-based Software Development for Automatic Train Protection System", [Online], 2009, pp. 463-466, [Retrieved from internet on Oct. 27, 2021], <https://ieeexplore.ieee.org/stamp/stamp.jsp?tp=&arnumber=5406387> (Year: 2009).*

French Patent Application No. 1850883, INPI Rapport De Recherche Préliminaire, Nov. 14, 2018, 2 pp.

French Patent Application No. 1850883, INPI Opinion Écrite Sur La Brevetabilité De L'Invention, 8 pp.

* cited by examiner

DEVELOPMENT METHOD FOR DEVELOPING A PROGRAM AND CORRESPONDING DEVELOPMENT DEVICE

CROSS-REFERENCE TO RELATED APPLICATIONS

This application claims priority of French Patent Application No. 18 50883, filed on Feb. 2, 2018.

FIELD OF THE INVENTION

The present invention relates to a method for developing a computer program able to be executed by a processor of an information processing unit, of the type comprising:
- providing at least one computer operator able to be executed by the processor of the information processing unit so as to process at least one incoming datum;
- providing a visual environment for building a visual representation of the computer program, said visual representation including at least one functional graphic element representing the computer operator, said functional graphic element comprising at least one input for supplying the computer operator with an incoming datum; and
- implementing the computer program.

The invention also relates to a device for developing a computer program able to be executed by a processor of an information processing unit, the device being of the type comprising:
- a memory in which at least one computer operator is stored able to be executed by the processor of the information processing unit so as to process at least one incoming datum;
- a man-machine interface including a visual environment able to present a visual representation of the computer program, said visual representation including at least one functional graphic element representing the computer operator, said functional graphic element comprising at least one input for supplying the computer operator with an incoming datum; and
- an implementation module of the computer program, able to implement the computer program based on the visual representation presented by the visual environment.

BACKGROUND OF THE INVENTION

Methods and devices for developing computer programs of the aforementioned type are known and constitute so-called "graphic" programming means that allow easy development of a computer program by simple manipulation of graphic elements presented by a viewer.

One example development method of the aforementioned type is typically formed by the development of a computer program using the functional block diagram language defined by standard CEI 61131-3.

In the known methods, the visual representation of the computer program is built by connecting the inputs and outputs of functional graphic elements to one another representing different operators using graphic stream elements representing data produced by certain computer operators and intended to be processed by others.

In these methods, the connections are purely static, which means that, for a computer operator to be able to be used several times by the program (typically to process different data), the corresponding functional graphic element must be duplicated manually within the visual environment a number of times equal to the number of instances of the operator that one wishes to see included in the final program.

These development methods, however, raise certain problems, particularly in the field of railway signalization. Indeed, in this field, the number of instances of an operator most often depends on a number of trains and/or a number of objects on the track (switches, signals, etc.) present in the network intended to be managed by the railway signalization program. Yet these numbers of trains and objects on the track are highly variable from one network to another, which necessarily requires heavy changes to the visual representation of the railway signalization programs for each new network where these are intended to be deployed, by adding or deleting, within this visual representation, the functional graphic elements of certain operators of the program.

SUMMARY OF THE DESCRIPTION

One aim of the invention is to make it possible to adapt the visual representation of a computer program easily to a particular context. Another aim is to allow the development, from a same visual representation, of computer programs adapted to different contexts.

To that end, according to a first aspect, the invention relates to a development method of the aforementioned type, wherein the visual representation also includes:
- a plurality of graphic stream elements each representing a respective datum intended to be processed by the computer operator; and
- at least one instancing graphic element connected to an input of the functional graphic element and to each of the graphic stream elements, and, during the implementation step, the computer operator is instantiated a number of times equal to the number of graphic stream elements, each instance of the computer operator having, as incoming data, a respective datum from the data represented by the graphic stream elements.

According to specific embodiments of the invention, the development method also includes one or more of the following features, considered alone or according to any technically possible combination(s):
- the visual environment allows the building of the visual representation by a human user;
- the computer program is a railway signalization program; and
- the visual representation includes a single functional graphic element representing the computer operator.

The invention also relates, still according to the first aspect, to a computer program comprising software instructions, which, when executed by a computer, carry out a method as defined above, and a computer-readable medium comprising such a computer program.

The invention also relates, still according to the first aspect, to a development method of the aforementioned type, wherein the visual representation also includes:
- a plurality of graphic stream elements each representing a respective datum intended to be processed by the computer operator; and
- at least one instancing graphic element connected to an input of the functional graphic element and to each of the graphic stream elements, and the implementation module of the computer program is able to instantiate the computer operator within the computer program a number of times equal to the number of graphic stream elements, each instance of the computer operator having, as incoming data, a respective datum from the data represented by the graphic stream elements.

According to specific embodiments of the invention, the development device also includes one or more of the following features, considered alone or according to any technically possible combination(s):
- the visual environment allows the building of the visual representation by a human user;
- the computer program is a railway signalization program; and
- the visual representation includes a single functional graphic element representing the computer operator.

According to a second aspect, the invention also relates to a development method of the aforementioned type, wherein the visual representation also includes:
- at least one other functional graphic element representing a data source able to produce source data intended to be processed by the computer operator, said other functional graphic element comprising an output for the supply, by the data source, of each source datum; and
- at least one instancing graphic element connected to an input of the functional graphic element and to the output of the other functional graphic element, and, during the implementation step, the computer operator is instantiated a number of times equal to the number of source data, each instance of the computer operator having, as incoming data, a respective datum from said source data.

According to specific embodiments of the invention, the development method also includes one or more of the following features, considered alone or according to any technically possible combination(s):
- the source data is able to produce a plurality of source data, the quantity of source data produced at a given moment being variable;
- the visual environment allows the building of the visual representation by a human user;
- the computer program is a railway signalization program; and
- the visual representation includes a single functional graphic element representing the computer operator.

The invention also relates, still according to the second aspect, to a computer program comprising software instructions, which, when executed by a computer, carry out a method as defined above, and a computer-readable medium comprising such a computer program.

The invention also relates, still according to the second aspect, to a development method of the aforementioned type, wherein the visual representation also includes:
- at least one other functional graphic element representing a data source able to produce source data intended to be processed by the computer operator, said other functional graphic element comprising an output for the supply, by the data source, of each source datum; and
- at least one instancing graphic instancing element connected to the output of the other functional graphic element and to an input of the functional graphic element, and the implementation module of the computer program is able to instantiate the computer operator within the computer program a number of times equal to the number of data sources, each instance of the computer operator having, as incoming datum, a respective datum from said source data.

According to specific embodiments of the invention, the development device also includes one or more of the following features, considered alone or according to any technically possible combination(s):
- the source data is able to produce a plurality of source data, the quantity of source data produced at a given moment being variable;
- the visual environment allows the building of the visual representation by a human user;
- the computer program is a railway signalization program; and
- the visual representation includes a single functional graphic element representing the computer operator.

BRIEF DESCRIPTION OF THE DRAWINGS

Other features and advantages of the invention will appear upon reading the following description, provided solely as an example and done in reference to the appended drawings, in which.

DETAILED DESCRIPTION

Figure 1:
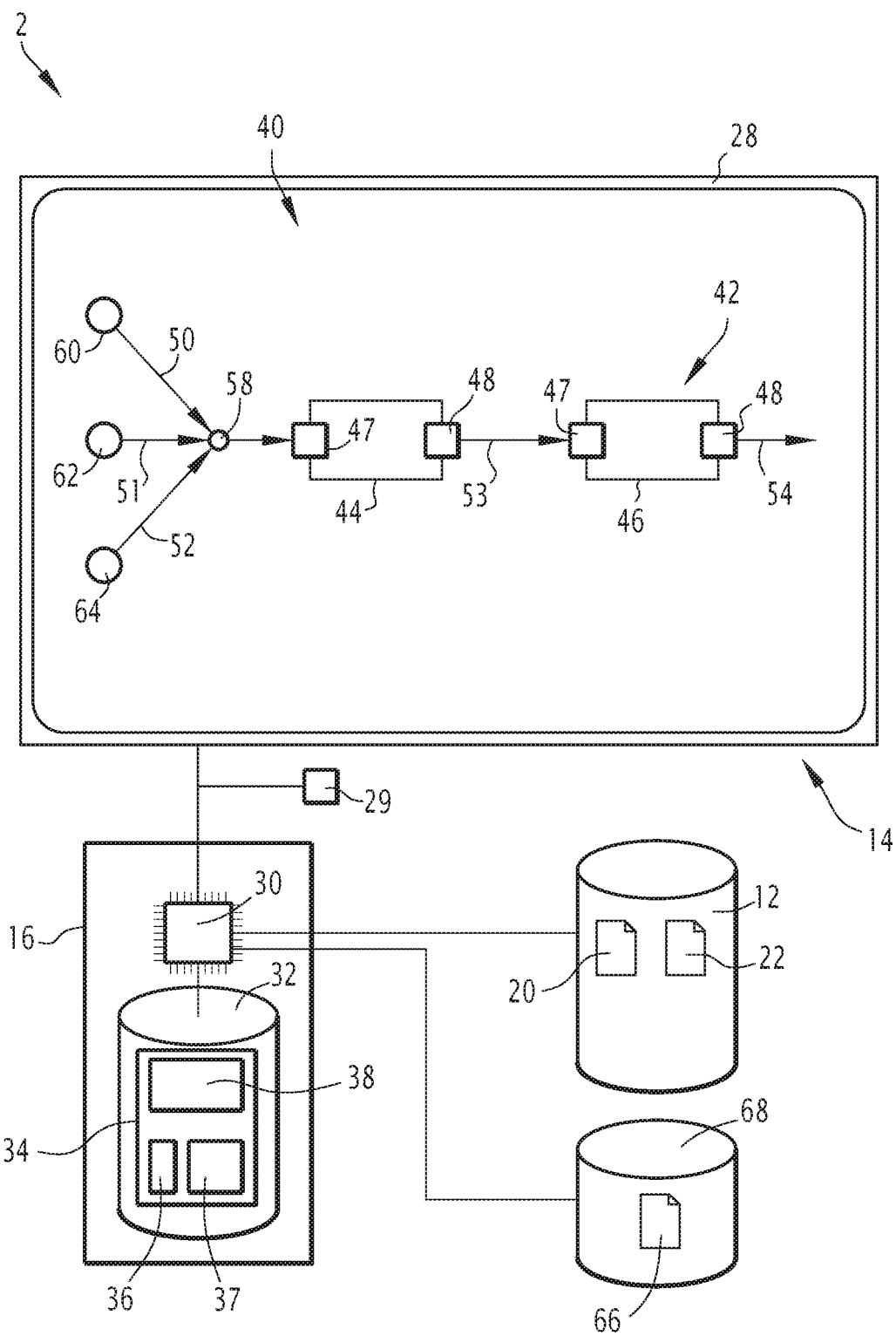
FIG. 1 is a schematic view of a device for developing a computer program, according to a first alternative of the first aspect of the invention.

The devices 2, 4, 6 and 8 for developing computer programs, shown respectively in FIGS. 1, 2, 3 and 4, are each intended to develop a computer program able to be executed by a processor of an information processing unit. This computer program is in particular made up of a railway signalization program able to be executed by a processor of an information processing unit of a railway signalization system (not shown) and advantageously able to output a movement authorization for a railway vehicle or a command for changing the engagement state of one or more lights and/or one or more switches.

To that end, each development device 2, 4, 6, 8 comprises a first memory 12, a man-machine interface 14, and an information processing unit 16.

The memory 12 stores a plurality of computer operators 20, 22 each able to be executed by the processor so that the computer program is developed so as to process at least one incoming datum and produce at least one outgoing datum.

In the example shown here, the computer operator 20 is suitable for processing a single incoming datum and producing a single outgoing datum. The computer operator 22 is in turn suitable for processing at least one incoming datum and producing a single outgoing datum.

The operator 20 is for example a square multiplication operator, able to process an incoming numerical value and produce an outgoing numerical value consisting of the square of said incoming numerical value.

The operator 22 is for example a sum operator, able to process incoming numerical values and produce an outgoing numerical value consisting of the sum of said incoming numerical values.

Figure 3:
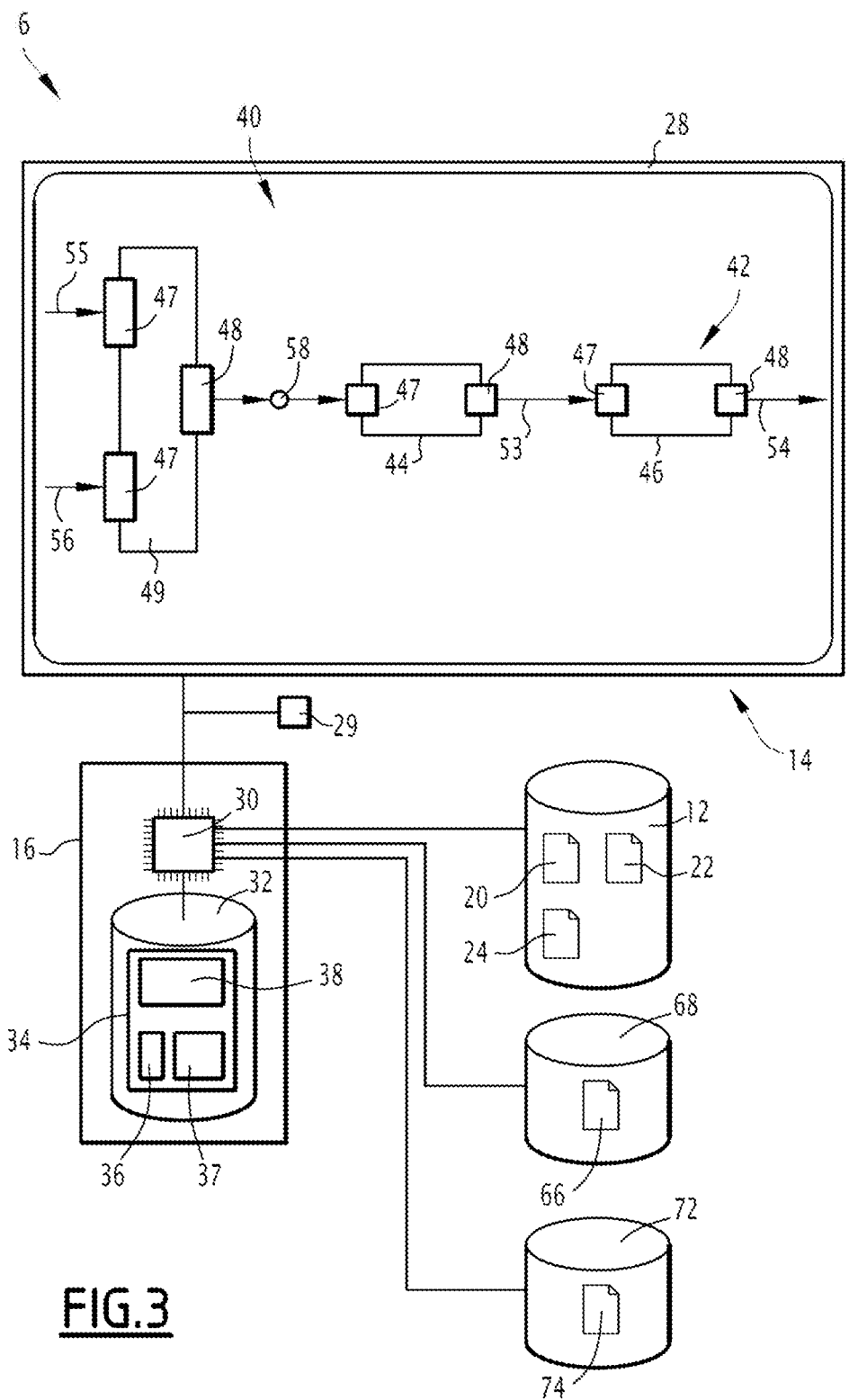
FIG. 3 is a schematic view of a device for developing a computer program, according to a first alternative of the first aspect of the invention.
Figure 4:
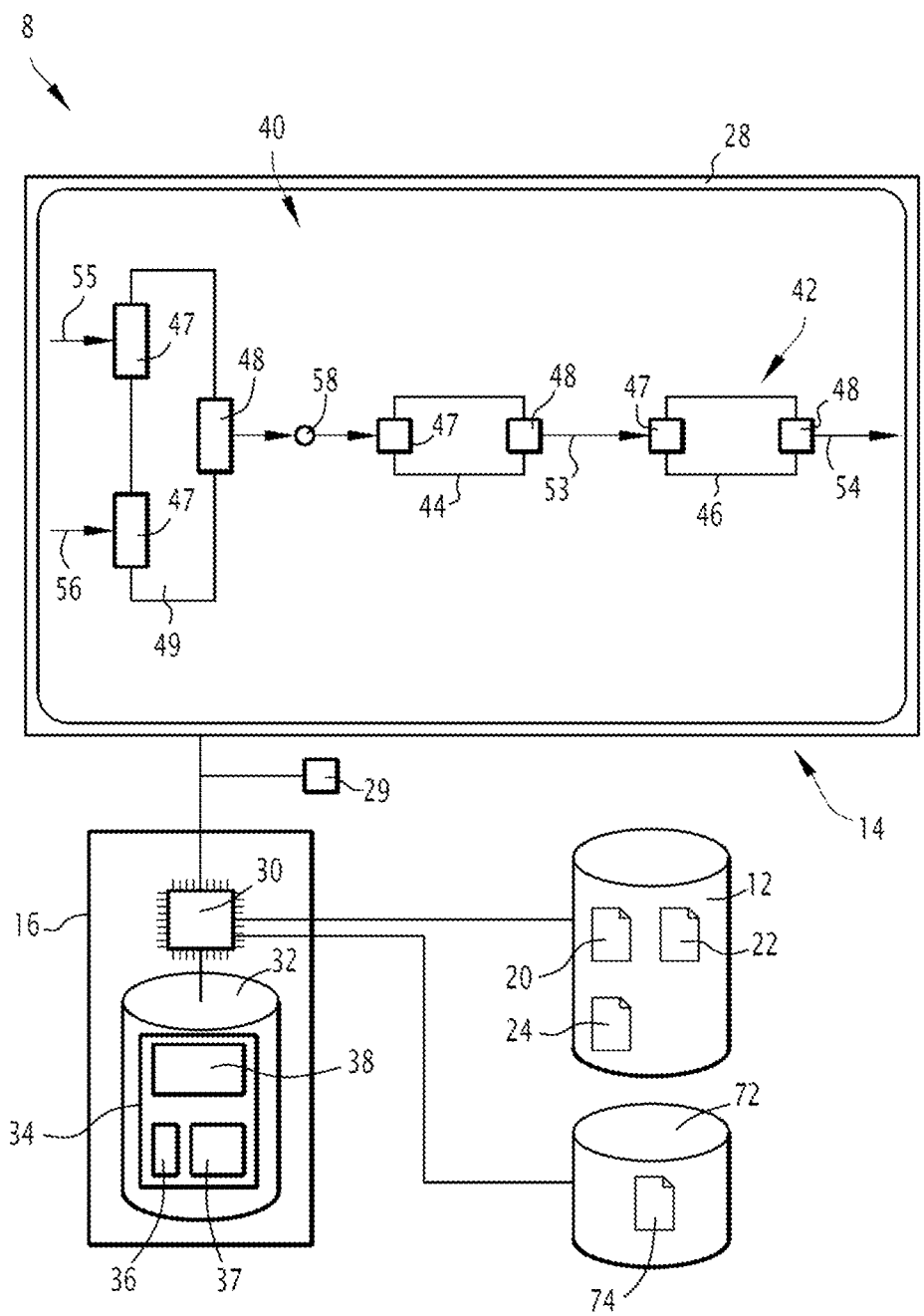
FIG. 4 is a schematic view of a device for developing a computer program, according to a first alternative of the first aspect of the invention.

In reference to FIGS. 3 and 4, the memory 12 of the devices 6 and 8 also stores an operator 24 that is also capable of being executed by the processor so that the computer program is developed, said operator 24 being suitable for processing two incoming data to produce a plurality of outgoing data, said outgoing data being intended to be processed by the operator 20.

Said operator 24 is typically made up of a parser having, for incoming data, a file name and a location path for locating portions of the document bearing said file name, said parser producing an outgoing datum for each portion of the document indicated by the location path.

The man-machine interface 14 comprises a viewer 28, typically made up of a screen. Preferably, the man-machine interface 14 also comprises an interaction device 29 allowing the interaction of a human user with information presented by the viewer 28, said interaction device 29 typically including a touch-sensitive interface, a keyboard and/or a voice recognition device.

The information processing unit 16 comprises a processor 30 and a second memory 32 in which a computer program 34 is stored that is able to be executed by the processor 30. It will be noted that although the first and second memories 12, 32 here are presented as separate from one another, these memories 12, 32 are alternatively (not shown) merged into a single memory.

The computer program 34 comprises a first set 36 of software instructions forming a deployment module of the program 34, a second set 37 of software instructions forming a graphic programming module, and a third set 38 of software instructions forming an implementation module of the computer program.

The deployment module 36 is configured to create the operators 20, 22 in the first memory 12 upon the first execution of the computer program 34 by the processor 30. Alternatively (not shown), typically in the case where the first and second memories 12, 32 are fused, the deployment module 36 is replaced by a container containing the operators 20, 22.

The graphic programming module 37 is configured to produce a visual programming environment 40 displayed by the viewer 28 and with which a human user can interact via the interaction device 29 of the man-machine interface 14.

This visual environment 40 is configured to allow the building, by a human user, of a visual representation 42 of the computer program to be developed, and to present this visual representation 42 via the viewer 28.

To that end, the visual environment 40 is configured to present functional graphic elements 44, 46 representing the computer operators 20, 22, each functional graphic element 44, 46 comprising at least one input 47 for supplying the computer operator 20, 22 with its incoming datum or one of its incoming data, and at least one output 48 for the supply, by the computer operator 20, 22, of its outgoing datum or one of its outgoing data.

These functional graphic elements 44, 46 typically assume block form, as shown.

In the illustrated example, each of the functional graphic elements 44, 46 comprises only a single input 47 and a single output 48. The input 47 of the functional graphic element 44 is intended to supply the operator 20 with its unique incoming datum, and the output 48 of said functional graphic element 44 is intended to supply the unique outgoing datum produced by the operator 20. The input 47 of the functional graphic element 46 is in turn intended to supply the operator 22 with its multiple incoming data, and the output 48 of said functional graphic element 46 is intended to supply the unique outgoing datum produced by the operator 22.

As shown in FIGS. 3 and 4, the visual environment 40 of the devices 6 and 8 is also configured to have a functional graphic element 49 representing the operator 24, said functional graphic elements 49 having two inputs 47, each for supplying the computer operator 24 with a respective datum from its incoming data, and a single output 48 for the supply, by the computer operator 24, of its outgoing data.

This functional graphic element 49 also, as shown, assumes block form.

The visual environment 40 is further configured to have graphic stream elements 50, 51, 52, 53, 54, 55, 56 each representing a respective datum intended to be processed or produced by one of the operators 20, 22.

These graphic stream elements 50, 51, 52, 53, 54, 55, 56 typically, as shown, assume the form of arrows.

The visual environment 40 is further configured to have at least one instancing graphic element 58.

This graphic instancing element 58 typically, as shown, assumes the form of a dot.

Figure 2:
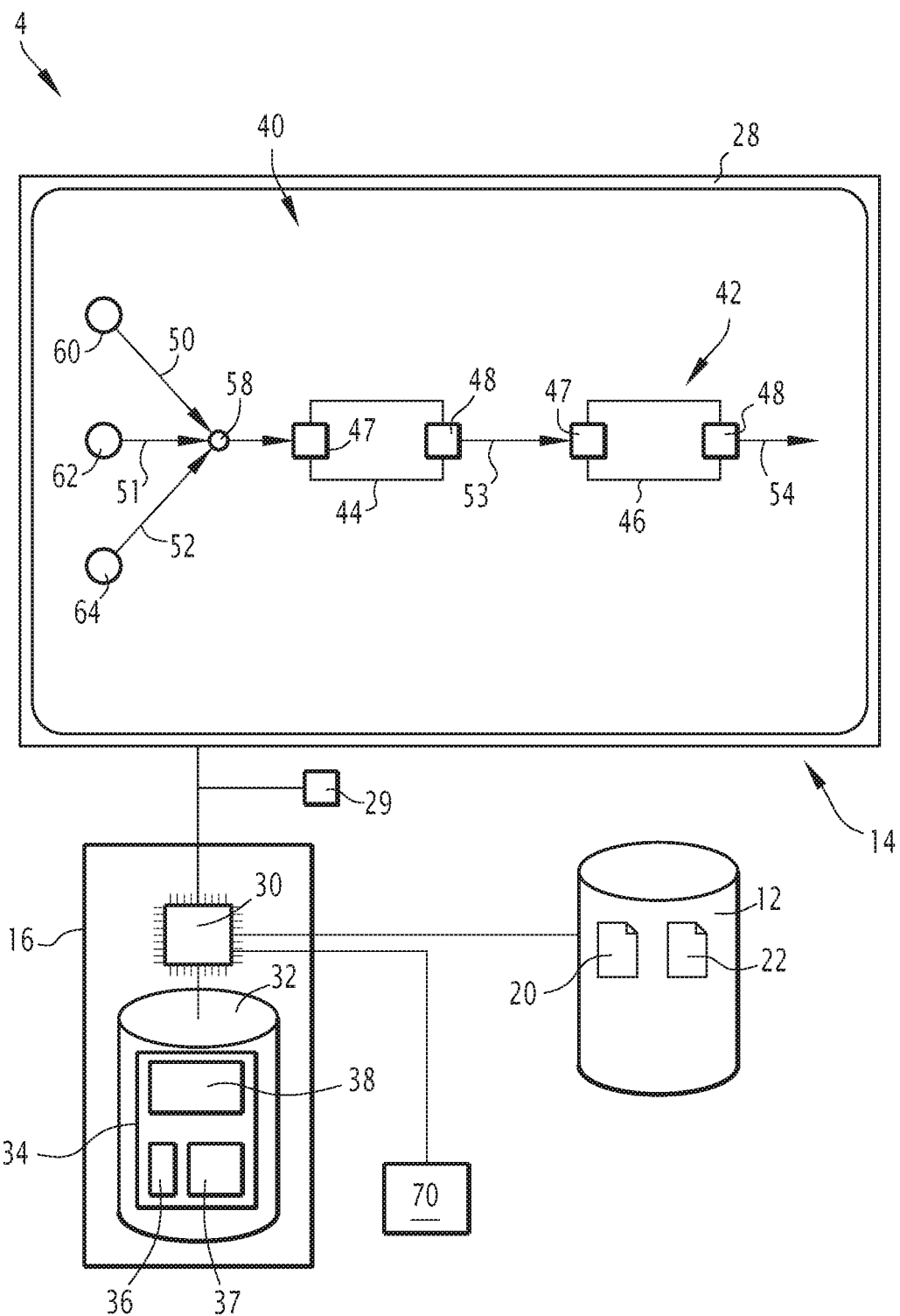
FIG. 2 is a schematic view of a device for developing a computer program, according to a first alternative of the first aspect of the invention.

Furthermore, as shown in FIGS. 1 and 2, the visual environment 40 of the devices 2 and 4 is configured to have graphic source elements 60, 62, 64 representing data sources (not shown) each providing at least one specific source datum.

The source data include, for example, data relating to at least one piece of equipment of a railway signaling system such as a switch, a light, a vehicle stopping device, a power isolation device to isolate electrical alimentation of a block or of a section of a railway track, or a vehicle presence detector for determining the occupied or unoccupied state of a block or of section of a railway track. Other examples of pieces of equipment for a railway signaling system could be given.

The source data include, for example, data selected from a group consisting of:
 engagement states of lights;
 information relating to the route and in particular to the block(s) to be used by a railway vehicle;
 engagement states of switches; and
 occupancy states of track sections.

The visual environment 40 is also configured to allow the manipulation, by a human user, of the different graphic elements 44, 46, 49, 50, 51, 52, 53, 54, 55, 56, 60, 62, 64 so as to move said graphic elements in the visual environment 40 and modify the connections of the graphic elements 44, 46, 49, 50, 51, 52, 53, 54, 55, 56, 60, 62, 64 relative to one another so as to build the visual representation 42.

The visual environment 40 is in particular configured so that the visual representation 42 includes a functional graphic element 44 representing a computer operator intended to be multi-instantiated, said computer operator here being formed by the operator 20, said functional graphic element 44 being unique within the visual representation 42.

As shown in FIGS. 1 and 2, the visual environment 40 of the devices 2 and 4 is also configured so that the visual representation 42 includes a plurality of graphic stream elements, here made up of the graphic stream elements 50, 51, 52, each representing a respective datum intended to be processed by the operator 20.

The visual environment 40 is lastly configured so that the visual representation 42 includes an instantiating graphic element 58, said instantiating graphic element 58 being able to be positioned on an interface, i.e., an input/output of anyone of the functional graphic elements 44, 46, 49.

In the shown examples, the instantiating graphic element 58 is in particular connected to the input 47 of the functional graphic element 44 and:

in the case of the devices 2 and 4, as shown in FIGS. 1 and 2, to each of the graphic stream elements 50, 51, 52; and in the case of the devices 6 and 8, as shown in FIGS. 3 and 4, to the output of the functional graphic element 49.

It will be noted that, in the case of the devices 6 and 8, since the output of the functional graphic element 49 is connected to the instantiating graphic element 58, which in turn is connected to the input of the functional graphic element 44, the operator 24 constitutes a data source with respect to the operator 20, the functional graphic element 49 in turn constituting a graphic source element.

The implementation module 38 is able to implement the computer program, i.e., to place it in a form in which it can be executed by the processor so that it is developed, based on the visual representation 42 presented by the visual environment 40.

To that end, the implementation module 38 is, in the case of the devices 2 and 6, made up of a compiler of the visual representation 42, able to convert the visual representation 42 into a code 66 written in a language interpretable by the processor for which the computer program is developed. In the case of the devices 4 and 8, the implementation module 38 is made up of an interpreter of the visual representation 42, able to execute the computer program on the processor 30 directly upon reading the visual representation, without generating intermediate code.

In reference to FIGS. 1 and 2, in the case of the devices 2 and 4, the implementation module 38 is in particular able, upon reading the graphic instantiating element 58, to instantiate the computer operator 20 represented by the functional graphic element 44, which has its input 47 connected to said instantiating graphic element 58 a number of times equal to the number of graphic stream elements 50, 51, 52 connected to the instantiating graphic element 58, each instance of said operator 20 having, as input datum, a respective datum from the data represented by said graphic stream elements 50, 51, 52.

In reference to FIGS. 3 and 4, in the case of the devices 6 and 8, the implementation module 38 is in particular able, upon reading the instantiating graphic element 58, to instantiate the computer operator 20 represented by the functional graphic element 44, which has its input 47 connected to said instantiating graphic element 58 a number of times equal to the number of output data produced by the operator 24, each instance of the operator 20 having, as input datum, a respective datum from said output data.

Advantageously, the embodiments of FIGS. 1 and 3 or 2 and 4 are adapted to be combined so that the instantiating graphic element 58 is connected, in addition to the input 47 of the functional graphic element 44, to several stream graphic elements among which at least one connects the instantiating graphic element 58 to the output of an upstream functional graphical element representing a computer operator configured to produce a plurality of output data. The implementation module 38 is then able, upon reading the instantiating graphic element 58, to instantiate the computer operator 20 a number of times equal to the number of data represented by the graphical flow elements connected to the instantiating graphic element 58, this number being a function of the number of these graphic flow elements and of the number of output data produced by the computer operator represented by the upstream functional graphical element.

Thus, the number of instances of the computer operator 20 is automatically adapted as soon as the number of output data produced by the computer operator represented by the upstream functional graphic element varies or the number of stream graphical elements in input is changed.

The development devices 2 and 6 also each include a storage medium 68 for storing the code 66 generated by the implementation module 38. This storage medium 68 is typically made up of a disc, a flash memory, a USB key, an internal memory of the device 2, 6 or any other appropriate type of storage medium. Optionally, this storage medium 68 is combined with the first memory 12 and/or the second memory 32.

The development device 4 in turn comprises a data source 70 for the operator 20. This data source 70 typically comprises at least one input (not shown) for receiving a signal provided by a piece of equipment outside the development device 4, for example a sensor.

Lastly, the development devices 6 and 8 comprise a third memory 72 storing a file 74 able to be used by the operator 24. Although this third memory 72 here is shown separate from the first and second memories 12, 32, it is alternatively (not shown) infused with said memories 12, 32.

Figure 5:
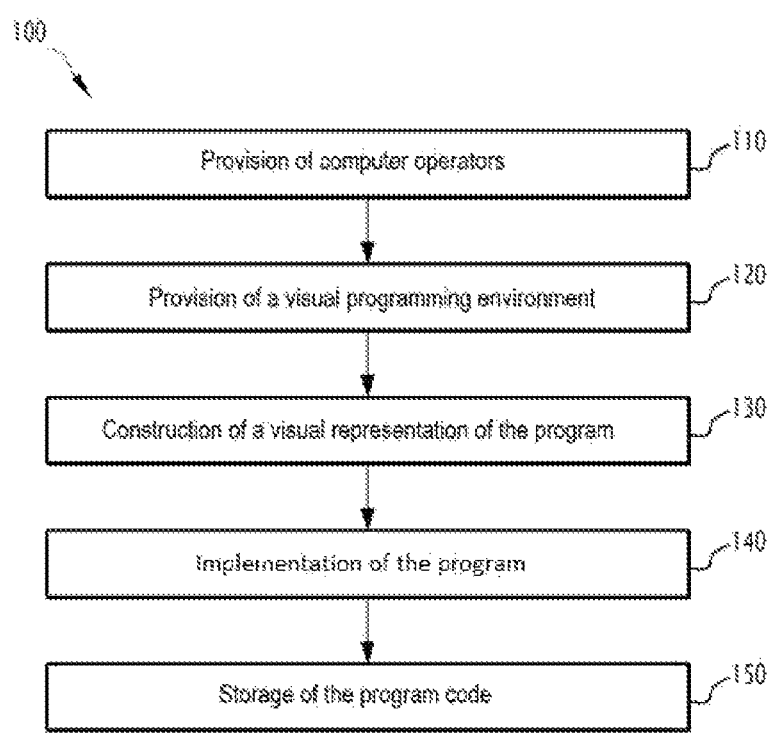
FIG. 5 is a block diagram illustrating a method carried out by the development device of FIG. 1, according to a first alternative of the first aspect of the invention.

A method 100 for developing a computer program using the developing device 2 will now be described, in reference to FIGS. 1 and 5.

The method 100 first comprises a first step 110 for the supply, by the computer program 34, of the operators 20, 22.

Then, during a second step 120, the graphic programming module 37 of the computer program 34 provides the visual environment 40.

Next, during a third step 130, a human user builds, via the visual environment 40, the graphic representation 42. To that end, the user positions, in the visual environment, the functional graphic elements 44, 46, the graphic stream elements 50, 51, 52, 53, 54, the instantiating graphic element 58 and the source graphic elements 60, 62, 64. He next connects the source graphic elements 60, 62, 64 to the instantiating graphic element 58 via the graphic stream elements 50, 51, 52, then connects said instantiating graphic element 58 to the input 47 of the functional graphic element 44. He next connects the output 48 of the functional graphic element 44 to the input 47 of the functional graphic element 46, then connects the output 48 of the functional graphic element 46 to the graphic stream element 54.

The user has thus built the graphic representation 42 of a computer program able to produce the sum of the squares of the values supplied by the sources represented by the graphic source elements 60, 62, 64.

This graphic representation 42 is implemented by the implementation module 38 of the computer program 34 during a fourth step 140. During this step 140, the module 38 compiles the visual representation 42 in a code 66 interpretable by the processor for which the program is developed. Furthermore, the module 38 instantiates the operator 20 within this code 66 a number of times equal to the number of graphic stream elements 50, 51, 52, each instance of the operator 20 having, as input datum, a respective datum from the data represented by the graphic stream elements 50, 51, 52; in other words, the operator 20 is copied into the code 66 as many times as the number of graphic stream elements 50, 51, 52, each iteration of the operator 20 having a specific incoming datum made up of one of the data represented by the graphic stream elements 50, 51, 52.

Lastly, during a fifth step 150, the code 66 thus generated by the module 38 is stored by the program 34 in the storage medium 68.

Figure 6:
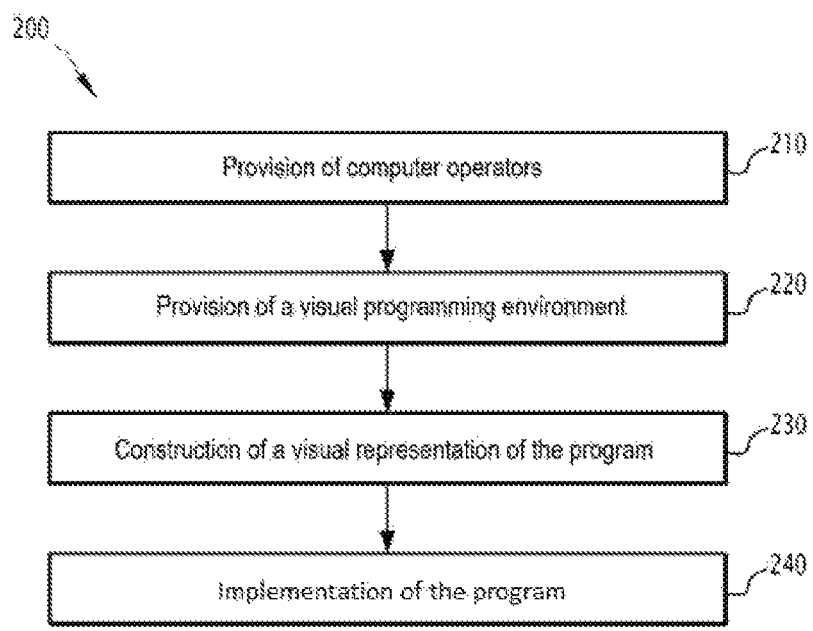
FIG. 6 is a block diagram illustrating a method carried out by the development device of FIG. 2, according to a first alternative of the first aspect of the invention.

A method 200 for developing a computer program using the developing device 4 will now be described, in reference to FIGS. 2 and 6.

The method 200 first comprises a first step 210 for the provision, by the computer program 34, of the operators 20, 22, followed by a second step 220 for provision of the visual environment 40 and a third step 230 for building of the graphic representation 42. These steps 210, 220, 230 are identical, respectively, to steps 110, 120 and 130 of the method 100.

These steps 210, 220, 230 are followed by a fourth step 240 for implementation of the computer program by the implementation module 38 of the computer program 34. During this step 240, the module 38 interprets the visual representation 42 by reading it and having it executed by the processor 30 over the course of this reading. Thus, the module 38 first interprets the graphic source elements 60, 62, 64 by recovering data via the data source 70. The module 38 next interprets the graphic stream elements 50, 51, 52, the graphic instantiating element 58 and the functional graphic element 44 by executing the operator 20 as many times as the number of graphic stream elements 50, 51, 52, the operator 20 being supplied, upon each of its executions, by a specific datum from the data recovered from the data source 70. Lastly, the module 38 interprets the graphic stream element 53 and the functional graphic element 46 by executing the operator 22 once, the operator 22 being supplied with the various outgoing data produced by the multiple executions of the operator 20.

Figure 7:
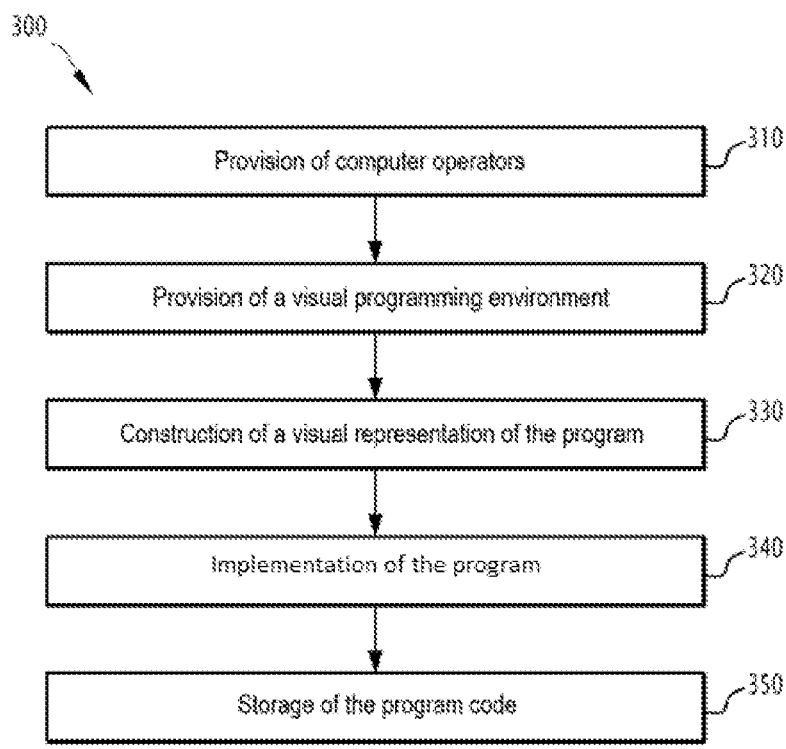
FIG. 7 is a block diagram illustrating a method carried out by the development device of FIG. 3, according to a first alternative of the first aspect of the invention.

A method 300 for developing a computer program using the developing device 6 will now be described, in reference to FIGS. 3 and 7.

The method 300 first comprises a first step 310 for the supply, by the computer program 34, of the operators 20, 22, 24.

Then, during a second step 320, the graphic programming module 37 of the computer program 34 provides the visual environment 40.

Next, during a third step 330, a human user builds, via the visual environment 40, the graphic representation 42. To that end, the user positions, in the visual environment, the functional graphic elements 44, 46, 49, the graphic stream elements 53, 54, 55, 56 and the instantiating graphic element 58. He next connects the graphic stream elements 55, 56 to the inputs 47 of the functional graphic element 49. He next connects the output 48 of the functional graphic element 49 and the input 47 of the functional graphic element 44 to the instantiating graphic element 58. Lastly, he connects the output 48 of the functional graphic element 44 to the input 47 of the functional graphic element 46, then connects the output 48 of the functional graphic element 46 to the graphic stream element 54.

The user has thus built the graphic representation 42 of a computer program able to produce the sum of the squares of the values contained in portions of a document.

This graphic representation 42 is implemented by the implementation module 38 of the computer program 34 during a fourth step 340. During this step 340, the module 38 compiles the visual representation 42 in a code 66 interpretable by the processor for which the program is developed. In particular, the implementation module 38 interprets the graphic stream elements 55, 56 and the functional graphic elements 49 by providing the operator 24 with the file 74 stored in the third memory 72 and executing the operator 24 such that it extracts, from said file 74, the portions of the file 74 indicated by a location path (not shown), then the module 38 instantiates the operator 20 within the code 66 a number of times equal to the number of portions of the file 74 indicated by the location path, each iteration of the operator 20 having, as incoming datum, a respective datum from among said portions of the file 74; in other words, the operator 20 is copied in the code 66 as many times as the number of portions extracted from the file 74, each iteration of the operator 20 having a specific incoming datum made up of one of the portions extracted from the file 74.

Lastly, during a fifth step 350, the code 66 thus generated by the module 38 is stored by the program 34 in the storage medium 68.

Figure 8:
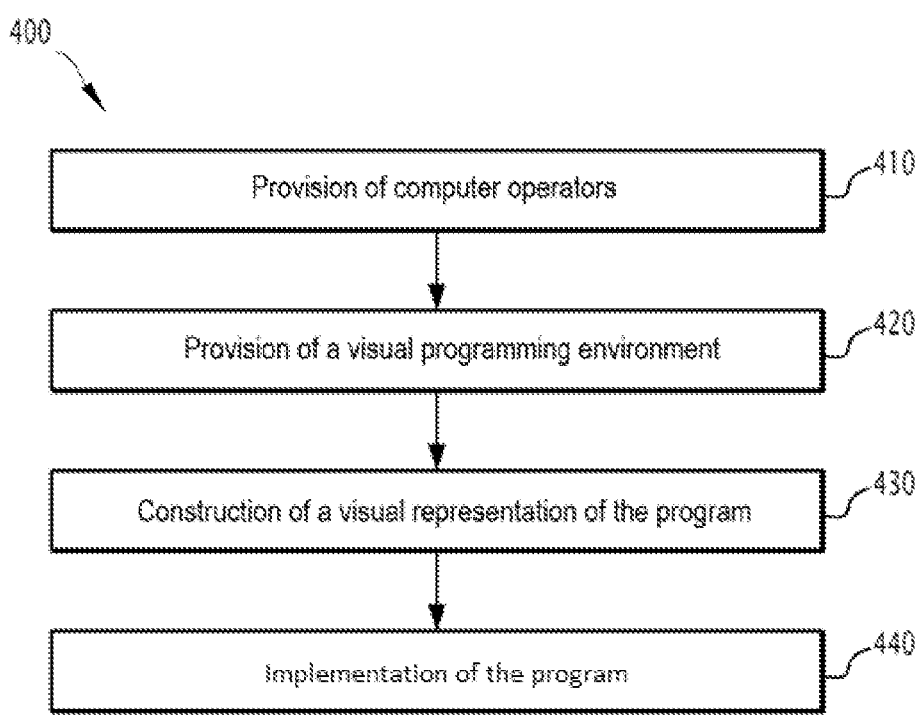
FIG. 8 is a block diagram illustrating a method carried out by the development device of FIG. 4, according to a first alternative of the first aspect of the invention.

A method 400 for developing a computer program using the developing device 4 will now be described, in reference to FIGS. 4 and 8.

The method 400 first comprises a first step 410 for the provision, by the computer program 34, of the operators 20, 22, 24, followed by a second step 420 for provision of the visual environment 40 and a third step 430 for building of the graphic representation 42. These steps 410, 420, 430 are identical, respectively, to steps 310, 320 and 330 of the method 300.

These steps 410, 420, 430 are followed by a fourth step 440 for implementation of the computer program by the implementation module 38 of the computer program 34. During this step 440, the module 38 interprets the visual representation 42 by reading it and having it executed by the processor 30 over the course of this reading. Thus, the module 38 first interprets the graphic stream elements 55, 56 and the functional graphic elements 49 by providing the operator 24 with the file 74 stored in the third memory 72 and executing the operator 24 such that it extracts, from said file 74, the portions of the file 74 indicated by a location path (not shown). The module 38 next interprets the instantiating graphic element 58 and the functional graphic element 44 by executing the operator 20 as many times as the number of outgoing graphic elements produced by the operator 24, the operator 20 being supplied, upon each of its executions, by a specific datum from among said outgoing data. Lastly, the module 38 interprets the graphic stream element 53 and the functional graphic element 46 by executing the operator 22 once, the operator 22 being supplied with the various outgoing data produced by the multiple executions of the operator 20.

Owing to the first aspect of the invention described above, it is thus possible to adapt the visual representation 42 of a computer program easily to a specific context. To that end, it indeed suffices to adjust the number of graphic stream elements 50, 51, 52 pointing to an instantiating graphic element 58, without it being necessary to duplicate the functional graphic elements 44, 46 coming from downstream from said instantiating graphic element 58.

It is even possible, owing to the second aspect of said invention, to develop computer programs adapted to different contexts from a same visual representation 42. The implementation module 38 indeed handles adapting the number of instances of the operator 20 represented by the functional graphic element 44 arranged downstream from an instantiating graphic element 58 based on the number of data supplied by the data source 49 arranged upstream from said instantiating graphic element 58.

One thus saves many steps for manual modification of the programs, the modifications being done automatically for the most part.

Although the program 34 is specifically described in the preceding description as being included in a memory 32 of an information processing unit 16, it will be noted that this is not limiting and that alternatively, the program 34 is included in any type of computer-readable medium.

The invention claimed is:

1. A development method for developing a computer program able to be executed by a processor of an information processing unit, comprising:

providing at least one computer operator able to be executed by the processor of the information processing unit so as to process incoming datum;

providing a visual environment for building a visual representation of a computer railway signalization program, the visual representation comprising (i) at least one functional graphic element representing the computer operator, the functional graphic element including at least one input for supplying the computer operator with an incoming datum, (ii) a plurality of graphic stream elements, each representing at least one respective datum relating to at least one piece of equipment of a railway signaling system, and wherein each graphic stream element represents a single specific datum intended to be processed by the computer operator, (iii) at least one instancing graphic element connected directly to an input of the functional graphic element and to each of the graphic stream elements, and (iv) at least one other functional graphic element representing a data source able to produce a quantity of source data intended to be processed by the computer operator, the quantity of source data produced at a given moment being variable, the other functional graphic element including an output for supply, by the data source, of each source datum, the instancing graphic element being connected to the output of the other functional graphic element via one of the graphic stream elements; and implementing the computer program, wherein, during the implementation, the computer operator is instantiated a number of times that is a function of the number of graphic stream elements and of the quantity of source data, each instance of the computer operator having, as incoming data, a respective datum from the data represented by the graphic stream elements.

2. The development method according to claim 1, wherein the visual environment allows building of the visual representation by a human user.

3. The development method according to claim 1, wherein the visual representation comprises a single functional graphic element representing the computer operator.

4. A non-transitory computer-readable medium including a computer program comprising software instructions which, when executed by a computer, cause the computer to carry out a development method according to claim 1.

5. A development device for developing a computer program able to be executed by a processor of an information processing unit, comprising:

a memory in which at least one computer operator is stored able to be executed by the processor of an information processing unit so as to process incoming datum;

a man-machine interface comprising a visual environment configured to present a visual representation of a computer railway signalization program, the visual representation comprising (i) at least one functional graphic element representing the computer operator, the functional graphic element comprising at least one input for supplying the computer operator with an incoming datum, (ii) a plurality of graphic stream elements representing at least one respective datum relating to at least one piece of equipment of a railway signaling system, and each graphic stream element representing a single specific datum intended to be processed by the computer operator, and (iii) at least one instancing graphic element connected directly to an input of the functional graphic element and to each of the graphic stream elements, and (iv) at least one other functional graphic element representing a data source able to produce a quantity of source data intended to be processed by the computer operator, the quantity of source data produced at a given moment being variable, the other functional graphic element comprising an output for supply, by the data source, of each source datum, the instancing graphic element being connected to the output of the other functional graphic element via one of the graphic stream elements; and an implementation module for implementing the computer program, configured to implement the computer program based on the visual representation presented by said visual environment, and to instantiate the computer operator within the computer program a number of times that is a function of the number of graphic stream elements and of the quantity of source data, each instance of the computer operator having, as incoming data, a respective datum from the data represented by the graphic stream elements.

6. The development device according to claim 5, wherein said visual environment allows building of the visual representation by a human user.

7. The development device according to claim 5, wherein the visual representation includes a single functional graphic element representing the computer operator.

* * * * *